(12) United States Patent
Wang et al.

(10) Patent No.: US 12,059,733 B2
(45) Date of Patent: Aug. 13, 2024

(54) SMART ELECTRIC POWER TOOL AND CONTROL METHOD THEREOF

(71) Applicant: Nanjing Chervon Industry Co., Ltd., Nanjing (CN)

(72) Inventors: Pengchen Wang, Nanjing (CN); Yang Li, Nanjing (CN); Zhongquan Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 10 days.

(21) Appl. No.: 18/189,802

(22) Filed: Mar. 24, 2023

(65) Prior Publication Data

US 2023/0234146 A1 Jul. 27, 2023

Related U.S. Application Data

(63) Continuation of application No. PCT/CN2021/119562, filed on Sep. 22, 2021.

(30) Foreign Application Priority Data

Nov. 9, 2020 (CN) .......................... 202011240815.9
Nov. 9, 2020 (CN) .......................... 202011242315.9

(51) Int. Cl.
*B23B 45/02* (2006.01)
*B23B 45/00* (2006.01)

(52) U.S. Cl.
CPC ............ *B23B 45/02* (2013.01); *B23B 45/008* (2013.01)

(58) Field of Classification Search
CPC .................................................... B23B 45/02
See application file for complete search history.

(56) References Cited

U.S. PATENT DOCUMENTS

| 4,249,117 A | 2/1981 | Leukhardt et al. | |
| 10,243,488 B2* | 3/2019 | Yabuguchi | ............ H02P 29/027 |
| 2018/0361559 A1* | 12/2018 | Bantle | .................. B25D 11/102 |

FOREIGN PATENT DOCUMENTS

| CN | 1539584 A | 10/2004 |
| CN | 101749370 A | 6/2010 |
| CN | 102581343 A | 7/2012 |
| CN | 102666024 A | 9/2012 |
| CN | 103481251 A | 1/2014 |
| CN | 104647264 A | 5/2015 |
| CN | 106346403 A | 1/2017 |

(Continued)

OTHER PUBLICATIONS

ISA/CN, Int. Search Report issued on PCT application No. PCT/CN2021/119562, dated Dec. 20, 2021, 4 pages.

(Continued)

*Primary Examiner* — Nathaniel C Chukwurah
(74) *Attorney, Agent, or Firm* — Greenberg Traurig, LLP (57) ABSTRACT

A smart power tool includes: an output shaft, an electric motor, a housing, and an adjustment assembly. The adjustment assembly is used for adjusting a working mode and outputting a mode signal. The working mode includes a drill gear mode and a wood screw mode. In the drill gear mode, a working state of the smart power tool is determined according to a set of current variables and/or a set of feature quantities and a type of a drill bit and, when the smart power tool is in a drill-through state, the electric motor is controlled to stop rotating.

20 Claims, 7 Drawing Sheets

(56) References Cited

FOREIGN PATENT DOCUMENTS

| CN | 107073692 A | 8/2017 |
|---|---|---|
| CN | 108326802 A | 7/2018 |
| CN | 110417324 A | 11/2019 |
| CN | 110695902 A | 1/2020 |
| CN | 111791191 A | 10/2020 |
| CN | 111823193 A | 10/2020 |
| DE | 102007062727 A1 | 7/2009 |
| WO | 2019210790 W | 11/2019 |

OTHER PUBLICATIONS

ISA/CN, English translation of Int. Search Report issued on PCT application No. PCT/CN2021/119562, dated Dec. 20, 2021, 3 pages.

ISA/CN, Written Opinion issued on PCT application No. PCT/CN2021/119562, dated Dec. 20, 2021, 3 pages.

ISA/CN, English translation of Written Opinion issued on PCT application No. PCT/CN2021/119562, dated Dec. 20, 2021, 3 pages.

* cited by examiner

```
┌─────────────────────────────────────────────────────────────┐
│ In a wood screw mode of a smart power tool, iteratively     │
│ filter a difference between a current value of the smart    │
│ power tool at any moment which is sampled within a first    │┐
│ preset sliding window and a current value of the smart      │├─ 110
│ power tool at a previous moment to obtain a first filtered  │┘
│ current difference                                          │
└─────────────────────────────────────────────────────────────┘
                              │
                              ▼
┌─────────────────────────────────────────────────────────────┐
│ Iteratively filter a difference between a current value of  │
│ the smart power tool at any moment which is sampled within  │┐
│ a second preset sliding window and a current value of the   │├─ 120
│ smart power tool at a previous moment to obtain a second    │┘
│ filtered current difference                                 │
└─────────────────────────────────────────────────────────────┘
```

SMART ELECTRIC POWER TOOL AND CONTROL METHOD THEREOF

RELATED APPLICATION INFORMATION

This application is a continuation of International Application Number PCT/CN2021/119562, filed on Sep. 22, 2021, through which this application also claims the benefit under 35 U.S.C. § 119(a) of Chinese Patent Application No. 202011242315.9, filed on Nov. 9, 2020, and Chinese Patent Application No. 202011240815.9, filed on Nov. 9, 2020, which applications are incorporated herein by reference in their entirety.

BACKGROUND

With the development of power tools, the intelligent control technology of power tools has increasingly wide applications. For example, an electric drill/screwdriver uses a controller to drive an electric motor to mount and detach fasteners and perform other operations.

However, in the working process of the electric drill/screwdriver, for example, in the process of the electric drill/screwdriver drilling a workpiece (for example, a wood board) through, if the electric drill/screwdriver can be stopped once a drill bit drills the wood board through, it is considered that relatively good control is performed. However, in the related art, the electric drill is typically controlled by a user to stop, easily resulting in problems such as low working efficiency.

SUMMARY

In a first aspect, an embodiment of the present application provides a smart power tool. The smart power tool includes: an output shaft for outputting torsion; an electric motor for driving the output shaft to rotate; a housing for accommodating the electric motor; a transmission assembly for connecting the electric motor to the output shaft; an adjustment assembly for adjusting a working mode of the smart power tool and outputting a mode signal, where the working mode includes at least a drill gear mode; a detection unit for detecting a current value of the smart power tool in operation; and a controller for receiving the mode signal and determining a set of current variables according to the working mode and the current value of the smart power tool in operation, where the set of current variables includes a current difference and a filtered current difference; determining, according to the set of current variables, whether startup of the smart power tool is completed; determining a set of feature quantities according to the set of current variables after the startup is completed; determining a type of a drill bit of the smart power tool according to the set of feature quantities; and determining a working state of the smart power tool according to the set of current variables and/or the set of feature quantities and the type of the drill bit of the smart power tool and when determining that the smart power tool is in a drill-through state, controlling the electric motor to stop rotating so as to control the smart power tool to shut down.

In a second aspect, an embodiment of the present application further provides a control method of a smart power tool. The control method includes: acquiring a current value of the smart power tool in operation; determining a set of current variables according to the current value of the smart power tool in operation, where the set of current variables includes a current difference and a filtered current difference; determining, according to the set of current variables, whether startup of the smart power tool is completed; determining a set of feature quantities according to the set of current variables after the startup is completed; determining a type of a drill bit of the smart power tool according to the set of feature quantities; and determining a working state of the smart power tool according to the set of current variables and/or the set of feature quantities and the type of the drill bit of the smart power tool and if the smart power tool is in a drill-through state, controlling the smart power tool to shut down.

In a third aspect, an embodiment of the present application provides a smart power tool. The smart power tool includes: an output shaft for outputting torsion; an electric motor for driving the output shaft to rotate; a housing for accommodating the electric motor; a transmission assembly for connecting the electric motor to the output shaft; an adjustment assembly for adjusting a working mode of the smart power tool and outputting a mode signal, where the working mode includes at least a wood screw mode; a detection unit for detecting a bus current value of the smart power tool in operation; and a controller for receiving the mode signal and determining a first detection value according to the working mode and the bus current value of the smart power tool in operation; determining, according to the first detection value, whether startup of the smart power tool is completed; identifying a slip condition of the smart power tool according to the first detection value after the startup is completed, and filtering a variation of the first detection value under the slip condition; determining a second detection value according to a first detection value after filtering; and when the first detection value after filtering and the second detection value satisfy a preset condition, controlling the electric motor to stop rotating so as to control the smart power tool to shut down.

In a fourth aspect, an embodiment of the present application further provides a control method of a smart power tool. The control method includes: acquiring a bus current value of the smart power tool in operation; determining a first detection value according to the bus current value of the smart power tool in operation; determining, according to the first detection value, whether startup of the smart power tool is completed; identifying a slip condition of the smart power tool according to the first detection value after the startup is completed, and filtering a variation of the first detection value under the slip condition; determining a second detection value according to a first detection value after filtering; and if the first detection value after filtering and the second detection value satisfy a preset condition, triggering the smart power tool to shut down.

DETAILED DESCRIPTION

Hereinafter the present application is described in detail in conjunction with the drawings and examples.

Figure 1:
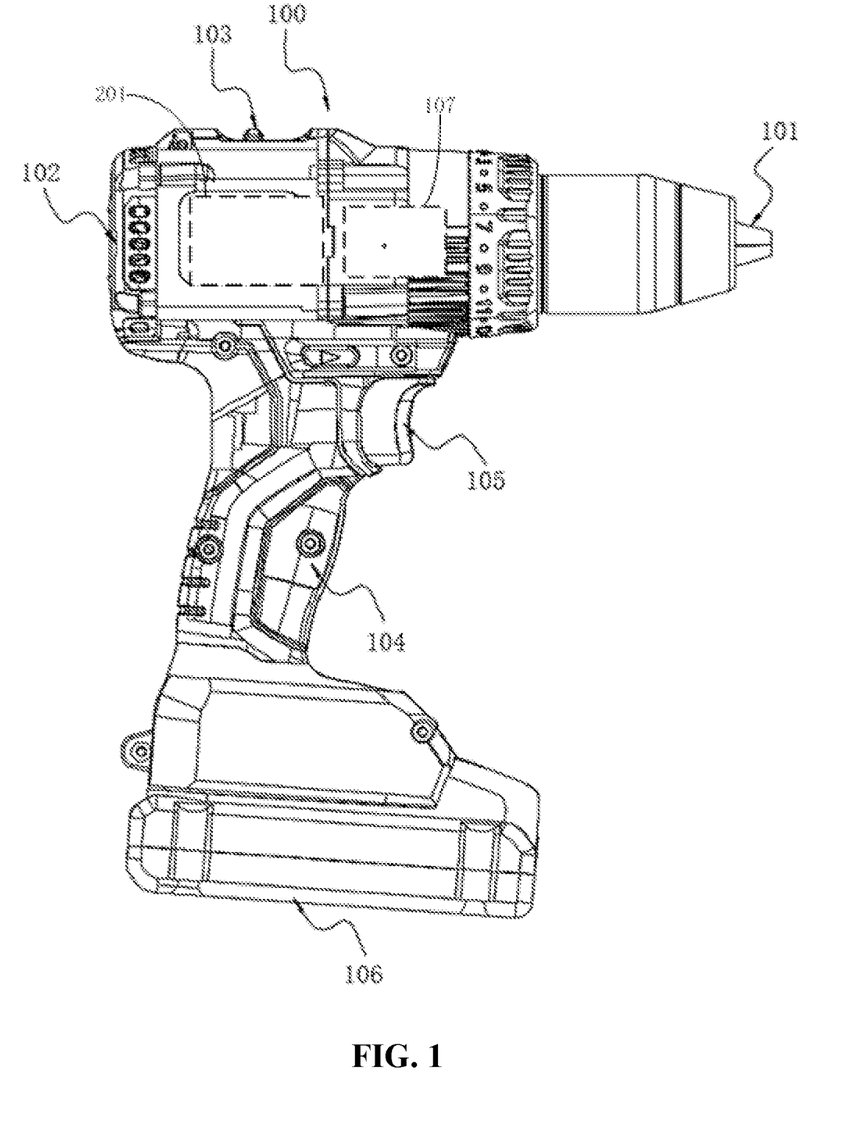
FIG. 1 is a structural view of a smart power tool according to an example of the present application.
Figure 2:
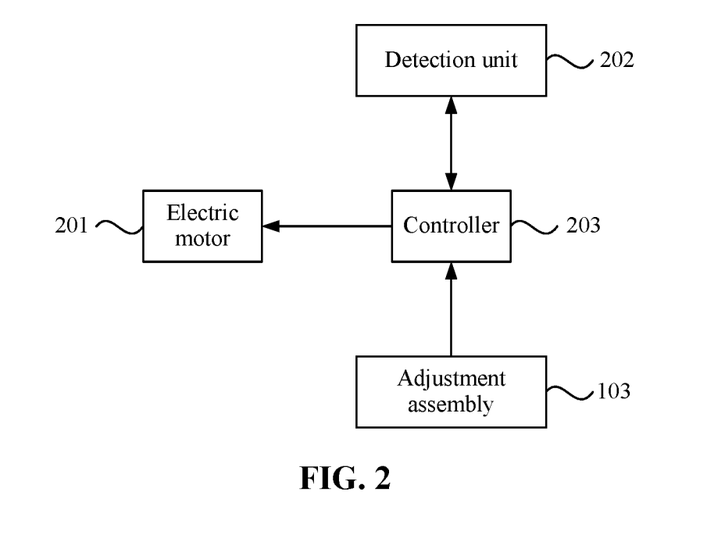
FIG. 2 is a block diagram of circuitry of a smart power tool according to an example of the present application.

FIG. 1 is a structural view of a smart power tool according to an example of the present application. FIG. 2 is a block diagram of circuitry of a smart power tool according to an example of the present application. Referring to FIG. 1, a smart power tool 100 includes an output shaft 101 for outputting torsion; an electric motor 201 for driving the output shaft 101 to rotate; a housing 102 for accommodating the electric motor 201; a transmission assembly 107 for connecting the electric motor 201 to the output shaft 101; and an adjustment assembly 103 for adjusting a working mode of the smart power tool and outputting a mode signal, where the working mode includes at least a drill gear mode or a wood screw mode. Referring to FIG. 2, the smart power tool further includes the adjustment assembly 103, a detection unit 202, the electric motor 201, and a controller 203, where the detection unit 202 is used for detecting a current value of the smart power tool in operation. In an example, the controller 203 receives the mode signal and determines a set of current variables according to the working mode and the current value of the smart power tool in operation, where the set of current variables includes a current difference and a filtered current difference; determines, according to the set of current variables, whether the startup of the smart power tool is completed; determines a set of feature quantities according to the set of current variables after the startup is completed; and determines a type of a drill bit of the smart power tool according to the set of feature quantities; and determines a working state of the smart power tool according to the set of current variables and/or the set of feature quantities and the type of the drill bit of the smart power tool and controls, when determining that the smart power tool is in a drill-through state, the electric motor to stop rotating so as to control the smart power tool to shut down. A current may be a bus current or a phase current. In an example, the controller 203 may also receive the mode signal and determine a first detection value according to the working mode and a bus current value of the smart power tool in operation; determine, according to the first detection value, whether the startup of the smart power tool is completed; identify a slip condition of the smart power tool according to the first detection value after the startup is completed, and filter a variation of the first detection value under the slip condition; determine a second detection value according to a first detection value after filtering; and when the first detection value after filtering and the second detection value satisfy a preset condition, control the electric motor to stop rotating so as to control the smart power tool to shut down.

In an example, the adjustment assembly 103 is electrically connected to the controller 203 and used for adjusting the working mode of the smart power tool and outputting the mode signal to the controller 203, the detection unit 202 detects the current value of the smart power tool in operation in real time and outputs the current value to the controller 203, and the controller 203 determines the set of current variables according to the received mode signal and the current value of the smart power tool in operation and determines, according to the set of current variables, whether the startup of the smart power tool is completed. If the startup of the smart power tool is completed, the set of feature quantities is determined according to the set of current variables, then the type of the drill bit of the smart power tool is determined according to the set of feature quantities, and finally the working state of the smart power tool is determined according to the set of current variables and/or the set of feature quantities and the type of the drill bit of the smart power tool and when it is determined that the smart power tool is in the drill-through state, the electric motor is controlled to stop rotating so as to control the smart power tool to shut down. That the working state of the smart power tool is determined according to the set of current variables and/or the set of feature quantities and the type of the drill bit of the smart power tool may include: performing determination according to the set of current variables and the type of the drill bit of the smart power tool; performing determination according to the set of feature quantities and the type of the drill bit of the smart power tool; or performing determination according to the set of current variables, the set of feature quantities, and the type of the drill bit of the smart power tool. Which determination method is specifically used may be set according to actual situations and is not specifically limited in this example.

The working state of the smart power tool may include a loaded state, the drill-through state, and the like.

Referring to FIG. 1, the smart power tool 100 includes the housing 102, the output shaft 101, a grip 104, a speed regulation mechanism 105, a power supply device 106, the electric motor, and the controller.

The housing 102 is formed with the grip 104 for a user to hold. The grip 104 may be provided as an independent part. The housing 102 constitutes the body of the smart power tool 100 and is used for accommodating the electric motor, the controller, the transmission assembly 107, and other electronic components such as a circuit board. The output shaft 101 may be used for mounting a functional element. The functional element is used for implementing a function of the smart power tool 100 and is driven by the electric motor to operate. Different smart power tools have different functional elements. The functional element of a screwdriver is a sleeve for implementing the function of fastening a screw or detaching a screw. The functional element is operably connected to the electric motor. Specifically, the functional element is electrically connected to the electric motor through the output shaft 101 and the transmission assembly 107.

The speed regulation mechanism 105 is used for setting at least a target rotational speed of the electric motor. That is to say, the speed regulation mechanism 105 is used for the speed regulation of the electric motor. The speed regulation mechanism 105 may be, but is not limited to, a trigger, a knob, a sliding mechanism, or the like. In this example, the speed regulation mechanism 105 is configured to be the trigger. In some examples, when an angle by which the trigger of a drill gear of the smart power tool is pressed is within a range of 0% to 10%, the corresponding duty cycle is 0% to 30% and increases in proportion, but an automatic shutdown function of the smart power tool is not triggered. When the angle by which the trigger is pressed is within a range of 10% to 100%, the corresponding duty cycle increases and can be stabilized to 100%. Therefore, a shutdown trigger function of the smart power tool can be activated when the angle by which the trigger is pressed is within the range of 10% to 100%.

The power supply device 106 is used for supplying electrical energy to the smart power tool 100. In this example, the smart power tool 100 is powered by a battery pack. Optionally, the smart power tool 100 further includes a battery pack coupling portion for connecting the battery pack to the smart power tool 100.

The electric motor and the controller of the smart power tool 100 are disposed in the housing 102 (which are not shown in FIG. 1), and the electric motor is used for driving, in response to a control signal from the controller, the corresponding functional element to operate, thereby making the smart power tool 100 operate normally.

A manner for determining the working mode of the smart power tool may be mounting a Hall sensor on the adjustment assembly and setting that for different working modes, the Hall sensor outputs corresponding AD sampling signals to the controller. The controller may identify the working mode of the smart power tool according to the received AD sampling signal.

According to the technical solutions provided in the examples of the present application, the smart power tool is provided. The smart power tool includes the output shaft for outputting torsion; the electric motor for driving the output shaft to rotate; the housing for accommodating the electric motor; the transmission assembly for connecting the electric motor to the output shaft; the adjustment assembly for adjusting the working mode of the smart power tool and outputting the mode signal, where the working mode includes at least the drill gear mode; the detection unit for detecting the current value of the smart power tool in operation; and the controller for receiving the mode signal and determining the set of current variables according to the working mode and the current value of the smart power tool in operation, where the set of current variables includes the current difference and the filtered current difference; determining, according to the set of current variables, whether the startup of the smart power tool is completed; determining the set of feature quantities according to the set of current variables after the startup is completed; determining the type of the drill bit of the smart power tool according to the set of feature quantities; and determining the working state of the smart power tool according to the set of current variables and/or the set of feature quantities and the type of the drill bit of the smart power tool and when determining that the smart power tool is in the drill-through state, controlling the electric motor to stop rotating so as to control the smart power tool to shut down. The problems of a poor automatic control effect and low working efficiency in the related art are solved, the type of the drill bit of the smart power tool can be determined according to the set of feature quantities, the working state of the smart power tool can be determined according to the set of current variables and/or the set of feature quantities and the type of the drill bit of the smart power tool, and when it is determined that the smart power tool is in the drill-through state, the smart power tool can be controlled to shut down. Therefore, when the drill gear is used, the type of the drill bit and the working state of the smart power tool can be automatically identified and when the smart power tool is in the drill-through state, the smart power tool can be controlled to automatically shut down, thereby improving working efficiency.

As a specific example of the smart power tool, the smart power tool may be an electric drill/screwdriver which includes the electric motor, the controller, the drill bit for fastening the screw, and the detection unit. Based on the preceding examples, with the electric drill/screwdriver as an example, the specific working principle of the smart power tool provided in the examples of the present application is described below. The adjustment assembly adjusts the working mode of the smart power tool and outputs the mode signal, and the controller determines the working mode of the electric drill/screwdriver according to the mode signal outputted from the adjustment assembly, for example, the working mode is the drill gear mode. In the drill gear mode, in the process of the drill bit drilling a workpiece (for example, a wall), the detection unit detects, in real time, the current value outputted from the electric motor of the electric drill/screwdriver and feeds back the current value detected in real time to the controller in real time, and the controller calculates, according to the current value received in real time, variables in the set of current variables at the corresponding moment in real time, such as the current difference and the filtered current difference. Whether the startup of the smart power tool is completed is determined according to the set of current variables; the set of feature quantities is determined according to the set of current variables after the startup is completed; the type of the drill bit of the smart power tool is determined according to the set of feature quantities; and the working state of the smart power tool is determined according to the set of current variables and/or the set of feature quantities and the type of the drill bit of the smart power tool and when it is determined that the smart power tool is in the drill-through state, the electric motor is controlled to stop rotating so as to control the smart power tool to shut down. It can be seen that the controller can identify the type of the drill bit of the smart power tool according to the set of feature quantities and can identify the working state of the smart power tool by performing determination according to the set of current variables, the set of feature quantities, and the type of the drill bit of the smart power tool and when the smart power tool is in the drill-through state, control the smart power tool to shut down so that the type of the drill bit and the working state of the smart power tool can be automatically identified and the smart power tool can shut down in time when it drills through, avoiding a loss caused by a failure of the electric motor to stop rotating in time when the drill bit drills through and improving the working efficiency.

Optionally, that the set of current variables is determined according to the working mode and the current value of the smart power tool in operation includes the following.

In the drill gear mode of the smart power tool, a difference between a current value of the smart power tool at any moment which is sampled within a first preset sliding window and a current value of the smart power tool at a previous moment is calculated so as to obtain the current difference, and the current difference is iteratively filtered so as to obtain the filtered current difference.

Assuming that $I(k)$ is the current value of the smart power tool at any moment which is sampled within the first preset sliding window, $I(k-1)$ is the current value of the smart power tool at the previous moment, the difference $\dot{I}$ between the current value of the smart power tool at any moment which is sampled within the first preset sliding window and the current value of the smart power tool at the previous moment is as follows:

$$\dot{I}=I(k)-I(k-1) \qquad (1)$$

The difference $\dot{I}$ between the current value of the smart power tool at any moment which is sampled within the first preset sliding window and the current value of the smart power tool at the previous moment is iteratively filtered so as to obtain a first filtered current difference $\bar{\dot{I}}$.

Figure 3:
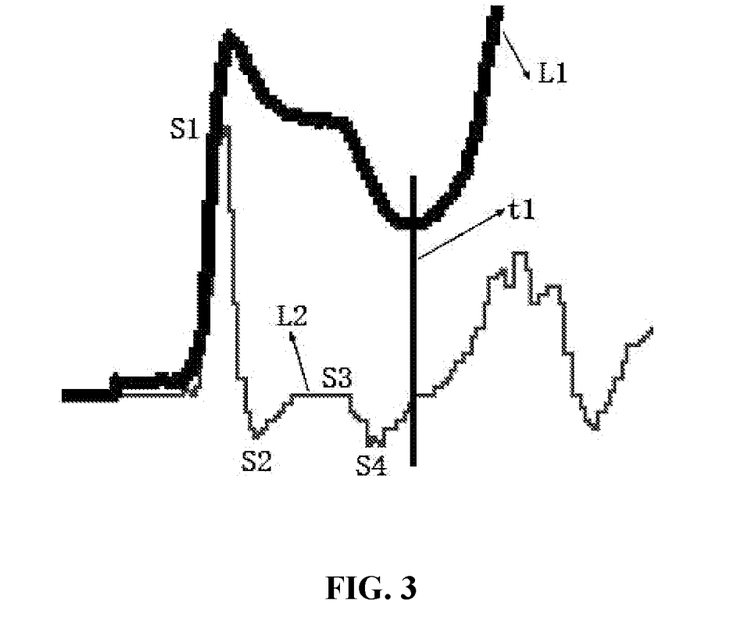
FIG. 3 is a change graph of a filtered current difference according to an example of the present application.

FIG. 3 is a change graph of a filtered current difference according to an example of the present application. Optionally, that whether the startup of the smart power tool is completed is determined according to the set of current variables includes the following.

A pulse-width modulation (PWM) value of the smart power tool is acquired, and if the PWM value of the smart power tool is greater than or equal to a preset PWM value, when the filtered current difference increases to a first preset threshold, decreases from the first preset threshold to a second preset threshold, increases from the second preset threshold to a third preset threshold, decreases from the third preset threshold to a fourth preset threshold, and finally increases from the fourth preset threshold to a value of zero, the startup of the smart power tool is completed.

Specifically, referring to FIG. 3, curve L1 is a change curve of AD values of a sampled filtered current and curve L2 is a change curve of the filtered current difference, where t1 denotes a moment when the startup is completed. Referring to curve L2, when the filtered current difference increases from zero to the first preset threshold (for example, position S1 in the figure), decreases from the first preset threshold to the second preset threshold (for example, position S2 in the figure), increases from the second preset threshold to the third preset threshold (for example, position S3 in the figure), decreases from the third preset threshold to the fourth preset threshold (for example, position S4 in the figure), and finally increases from the fourth preset threshold to the value of zero, it is determined that the startup of the smart power tool is completed. The first preset threshold is a positive value, the second preset threshold is a negative value, the third preset threshold may be zero, a positive value, or a negative value, and the fourth preset threshold is a negative value. Therefore, whether the startup of the smart power tool is completed is determined so that the accuracy with which the working state of the smart power tool is determined can be further improved, preventing false determination and a false shutdown.

Optionally, the controller is further used for determining the loaded state of the smart power tool according to a change of the filtered current difference after the startup is completed, where if the filtered current difference is greater than or equal to a fifteenth preset threshold and lasts for a second preset time, the smart power tool enters the loaded state.

The fifteenth preset threshold may be 2 and the second preset time may be twice a time length of the first preset sliding window.

Optionally, the set of feature quantities includes a first feature quantity, a second feature quantity, an oscillator ramp count, and the number of oscillation noise times, and that the set of feature quantities is determined according to the set of current variables after the startup is completed includes the following.

An integral of the filtered current difference with respect to a time count is determined according to the filtered current difference and the time count and recorded as the first feature quantity.

The oscillator ramp count is calculated according to the filtered current difference.

The number of oscillation noise times is calculated according to a current difference and an oscillation amplitude of a current signal within a second preset sliding window.

A pre-ramp and post-ramp current ratio is determined according to a pre-ramp current value and a post-ramp current value of an oscillator ramp signal and recorded as the second feature quantity.

Optionally, the first feature quantity is calculated by the following formula:

$$M_1=\int_0^t(\bar{\dot{I}}-a_1) \qquad (2)$$

where $M_1$ denotes the first feature quantity, $\bar{\dot{I}}$ denotes the filtered current difference, and $a_1$ denotes a fixed parameter.

$M_1$ denotes the integral of the filtered current difference with respect to time, and $a_1$ may have a value of 5 as the fixed parameter.

Optionally, if the filtered current difference is continuously less than a fifth preset threshold or if the filtered current difference is continuously greater than a sixth preset threshold, the oscillator ramp count is increased by 1, where an initial value of the oscillator ramp count is 0.

The fifth preset threshold may be −2 and the sixth preset threshold may be 2.

Figure 4:
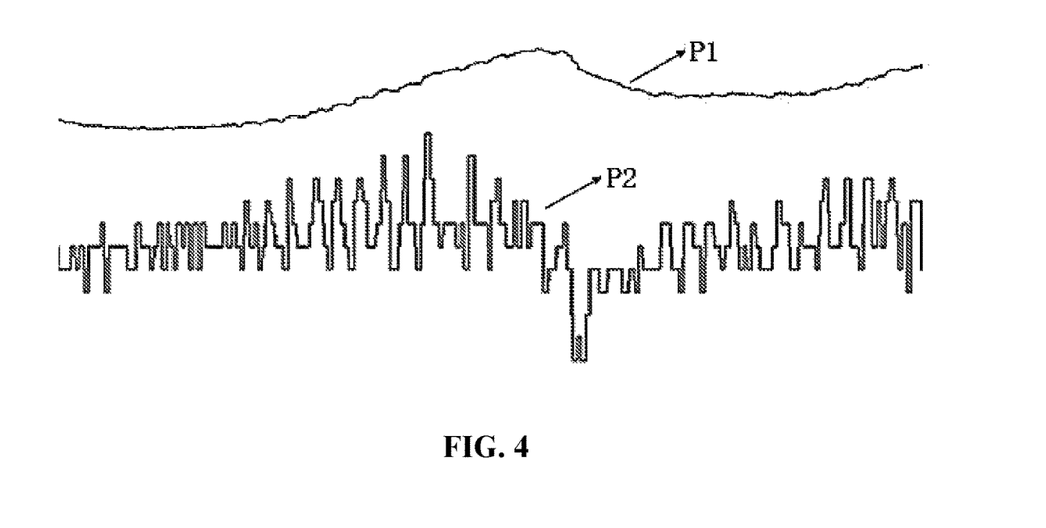
FIG. 4 is a change graph of a current difference according to an example of the present application.

FIG. 4 is a change graph of a current difference according to an example of the present application. Optionally, within the second preset sliding window, if a difference between a peak current difference and a valley current difference at each oscillation of the current difference is less than or equal to a seventh preset threshold or is greater than or equal to an eighth preset threshold, the number of oscillation noise times is increased by 1.

Referring to FIG. 4, P1 is a change curve of the current difference and P2 is a change curve of an oscillation waveform of the current difference. Optionally, referring to curves P1 and P2, the number of oscillation noise times of each of a first half and a second half may be calculated according to the oscillation waveform. Assuming that $n_{osc1}$ denotes the number of oscillation noise times of the first half and $n_{osc2}$ denotes the number of oscillation noise times of the second half, within the second preset sliding window, if the difference between the peak current difference and the valley current difference at each oscillation of the current difference is less than or equal to the seventh preset threshold, $n_{osc1}$ is increased by 1; and within the second preset sliding window, if the difference between the peak current difference and the valley current difference at each oscillation of the current difference is greater than or equal to the eighth preset threshold, $n_{osc2}$ is increased by 1. A time length of the second preset sliding window may be 20 times the time length of the first preset sliding window, the seventh preset threshold may be 2, and the eighth preset threshold may be 3.

Figure 5:
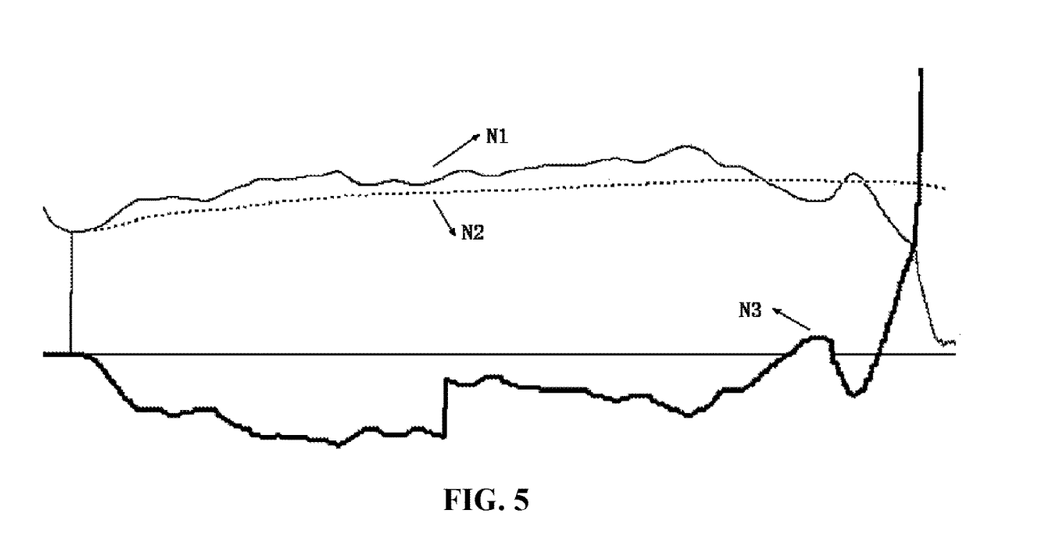
FIG. 5 is a change graph of a second feature quantity according to an example of the present application.

FIG. 5 is a change graph of a second feature quantity according to an example of the present application. Optionally, the second feature quantity is calculated by the following formula:

$$K_j=(I_{later}-I_{front})*100/I_{later} \qquad (3)$$

where $K_j$ denotes the second feature quantity, $I_{front}$ denotes the pre-ramp current value, and $I_{later}$ denotes the post-ramp current value.

A value of $I_{front}$ may depend on an integral differential average of the filtered current difference with respect to time. Assuming that $I_v$ denotes the integral differential average of the filtered current difference with respect to time, $I_v$ is calculated by the following formula:

$$I_v = \frac{\int_0^t (I \cdot a_0)}{t} + a_0 \qquad (4)$$

where $a_0$ denotes a fixed parameter and may have a value of 100. For the value of $I_{front}$, $I_v$ may be compared and the smaller one is used as the value of $I_{front}$. Referring to FIG. 5, N1 is a change curve of AD values of a filtered current, N2 is a change curve of the integral differential average of the filtered current difference with respect to time, and N3 is a change curve of the second feature quantity.

Optionally, that the type of the drill bit of the smart power tool is determined according to the set of feature quantities includes the following.

When the oscillator ramp count is less than or equal to a ninth preset threshold, if the number of oscillation noise times is greater than or equal to a tenth preset threshold, the drill bit of the smart power tool is a common spade drill bit.

The ninth preset threshold may be 1 and the tenth preset threshold may be 6.

Alternatively, when the oscillator ramp count is less than or equal to the ninth preset threshold, if the first feature quantity is greater than or equal to an eleventh preset threshold, the drill bit of the smart power tool is a self-tapping drill bit.

The eleventh preset threshold may be 50.

Alternatively, when the oscillator ramp count is greater than or equal to a twelfth preset threshold, the drill bit of the smart power tool is a twist drill bit.

The twelfth preset threshold may be 2.

Alternatively, when the oscillator ramp count is greater than or equal to the twelfth preset threshold, if the number of oscillation noise times is greater than or equal to the tenth preset threshold, the drill bit of the smart power tool is the common spade drill bit.

Optionally, the working state of the smart power tool is determined according to the set of current variables and/or the set of feature quantities and the type of the drill bit of the smart power tool, where the working state of the smart power tool may be the loaded state, the drill-through state, or the like. A method for determining the drill-through state may include a ramp method and a delay method. The ramp method includes the following.

When the drill bit of the smart power tool is the twist drill bit, if the second feature quantity is greater than or equal to a thirteenth preset threshold, the working state of the smart power tool is the drill-through state.

When the drill bit of the smart power tool is the self-tapping drill bit or the common spade drill bit, if the second feature quantity is greater than or equal to a fourteenth preset threshold, the working state of the smart power tool is the drill-through state.

The thirteenth preset threshold may be 25 and the fourteenth preset threshold may be 35.

The delay method includes the following.

When the drill bit of the smart power tool is the twist drill bit, if the filtered current difference is less than or equal to 0 and lasts for a first preset time, the working state of the smart power tool is the drill-through state.

The first preset time may be 50 times the time length of the first preset sliding window.

It is to be noted that no matter whether the ramp method or the delay method is used, as long as it is determined that the working state of the smart power tool is the drill-through state, it can be determined that the drill bit drills through and the controller controls the electric motor to stop rotating.

Figure 6:
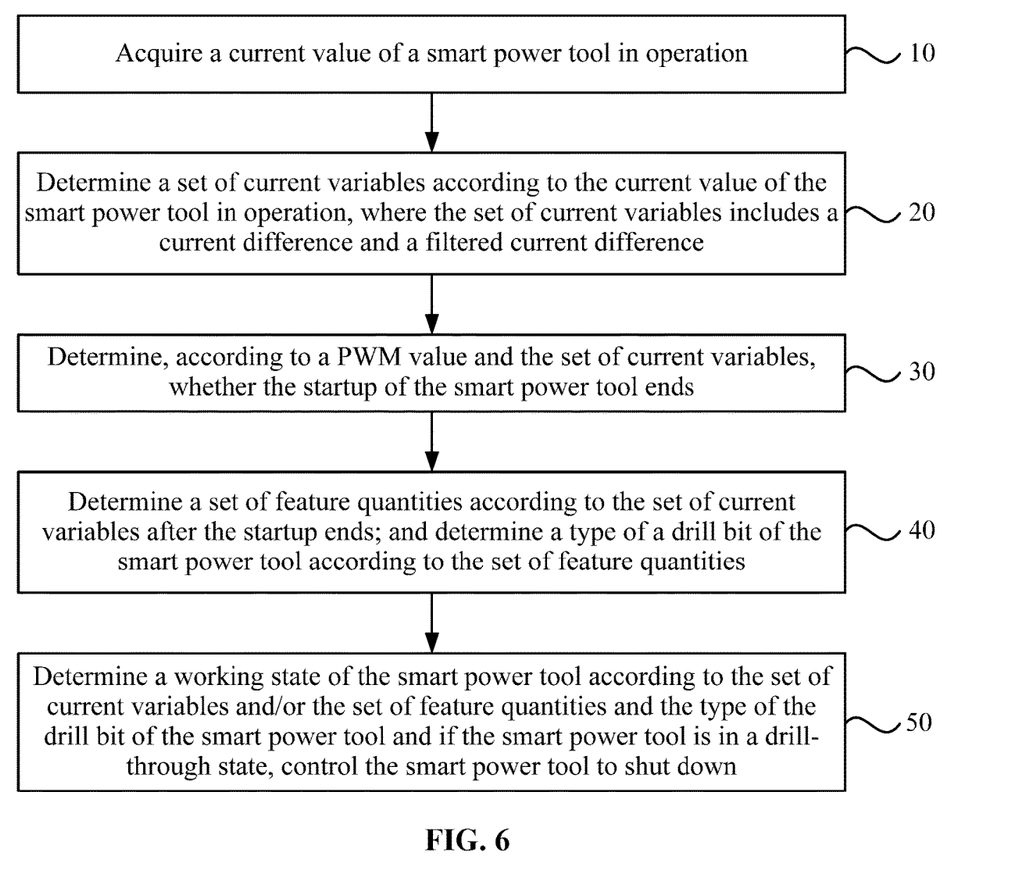
FIG. 6 is a flowchart of a control method of a smart power tool according to an example of the present application.

FIG. 6 is a flowchart of a control method of a smart power tool according to an example of the present application. This example is applicable to an implementation process of a control method of a smart power tool. The method may be performed by the smart power tool and may specifically be implemented by software and/or hardware in the smart power tool. Referring to FIG. 6, the method specifically includes the steps below.

In step 10, a current value of the smart power tool in operation is acquired.

The smart power tool includes an electric motor, a controller, a detection unit, and the like. Specifically, the current value of the smart power tool in operation may be acquired by the detection unit, such as a current sampling circuit or a current sensor. The detection unit is electrically connected to the electric motor and the controller, separately. The detection unit may be the current sampling circuit. The current sampling circuit may include a current detection resistor which can acquire the current value outputted from the smart power tool by acquiring a current flowing through the current detection resistor. The current sampling circuit acquires, in real time, the current value outputted from the electric motor and feeds back the current value acquired in real time to the controller in real time. The current acquired by the current sampling circuit may include a current of the smart power tool at any moment, for example, during startup, in a working process, and before a shutdown.

In step 20, a set of current variables is determined according to the current value of the smart power tool in operation, where the set of current variables includes a current difference and a filtered current difference.

Specifically, in the drill gear mode, the controller in the smart power tool calculates a difference between a current value of the smart power tool at any moment within a first preset sliding window and a current value of the smart power tool at a previous moment, which are acquired in real time through the current sampling circuit, to obtain the current difference and iteratively filters the difference to obtain the filtered current difference. The filtered current difference can reflect a change of a filtered current of the smart power tool within the first preset sliding window.

In step 30, whether the startup of the smart power tool is completed is determined according to a PWM value and the set of current variables.

Whether the startup of the smart power tool is completed is determined according to the PWM value and the set of current variables so as to distinguish a working state of the smart power tool so that false determination can be avoided and the control effect of an automatic shutdown of the smart power tool is improved.

In step 40, a set of feature quantities is determined according to the set of current variables after the startup is completed; and a type of a drill bit of the smart power tool is determined according to the set of feature quantities.

When different types of drill bit are mounted to the smart power tool, the specific control methods of the smart power tool may be differentiated. Therefore, to better improve the control effect of the automatic shutdown of the smart power tool, the type of the drill bit is identified before the working state of the smart power tool is determined and then the working state of the smart power tool is determined and processed according to the type of the drill bit in conjunction with parameters such as the set of current variables and/or the set of feature quantities.

In step 50, the working state of the smart power tool is determined according to the set of current variables and/or the set of feature quantities and the type of the drill bit of the smart power tool and if the smart power tool is in a drill-through state, the smart power tool is controlled to shut down.

Determination may be performed according to the set of current variables and the type of the drill bit of the smart power tool; determination may be performed according to the set of feature quantities and the type of the drill bit of the smart power tool; or determination may be performed according to the set of current variables, the set of feature quantities, and the type of the drill bit of the smart power tool. Which determination method is specifically used may be set according to actual situations and is not specifically limited in this example.

According to the technical solutions in this example, the working principle of the control method of the smart power tool is described below. In the working process of the smart power tool, the current value outputted from the smart power tool is detected and acquired in real time, and the set of current variables is determined according to the current value of the smart power tool in operation, where the set of current variables includes the current difference and the filtered current difference; whether the startup of the smart power tool is completed is determined according to the set of current variables; the set of feature quantities is determined according to the set of current variables after the startup is completed; the type of the drill bit of the smart power tool is determined according to the set of feature quantities; and the working state of the smart power tool is determined according to the set of current variables and/or the set of feature quantities and the type of the drill bit of the smart power tool and if the smart power tool is in the drill-through state, the smart power tool is controlled to shut down. It can be seen that the controller can identify the type of the drill bit of the smart power tool according to the set of feature quantities and can identify the working state of the smart power tool by performing determination according to the set of current variables, the set of feature quantities, and the type of the drill bit of the smart power tool and when the smart power tool is in the drill-through state, control the smart power tool to shut down so that the type of the drill bit and the working state of the smart power tool can be automatically identified and the smart power tool can shut down in time when it drills through, avoiding a loss caused by a failure of the electric motor to stop rotating in time when the drill bit drills through and improving working efficiency.

In an example, the working mode of the smart power tool further includes the wood screw mode. Further, the detection unit is used for detecting the bus current value of the smart power tool in operation; and the controller receives the mode signal and determines the first detection value according to the working mode and the bus current value of the smart power tool in operation; determines, according to the first detection value, whether the startup of the smart power tool is completed; identifies the slip condition of the smart power tool according to the first detection value after the startup is completed, and filters the variation of the first detection value under the slip condition; determines the second detection value according to the first detection value after filtering; and when the first detection value after filtering and the second detection value satisfy the preset condition, controls the electric motor to stop rotating so as to control the smart power tool to shut down. The problems of an automatic shutdown failure in the case of leveling and low working efficiency in the related art are solved, the electric motor is controlled according to the first detection value after filtering and the second detection value to stop rotating so as to control the smart power tool to shut down, and when a wood screw is leveled, the smart power tool is controlled to automatically shut down, improving the working efficiency.

The smart power tool provided in the examples of the present application may perform the control method of the smart power tool provided in any example of the present application and has functional modules and beneficial effects corresponding to the performed method.

As a specific example of the smart power tool, the smart power tool may be the electric drill/screwdriver which includes the electric motor, the controller, the drill bit for fastening the screw, and the detection unit. Based on the preceding examples, with the electric drill/screwdriver as an example, the specific working principle of the smart power tool provided in the examples of the present application is described below. The adjustment assembly adjusts the working mode of the smart power tool and outputs the mode signal, and the controller determines the working mode of the electric drill/screwdriver according to the mode signal outputted from the adjustment assembly, for example, the working mode is the wood screw mode. In the wood screw mode, in the process of the electric drill/screwdriver drilling the wood screw into a dry wall or a wood board, the detection unit detects, in real time, the bus current value outputted from the electric motor of the electric drill/screwdriver and feeds back the bus current value detected in real time to the controller in real time, and the controller calculates, according to the bus current value received in real time, the first detection value of the current at the corresponding moment in real time, and determines, according to the first detection value, whether the startup of the smart power tool is completed; identifies the slip condition of the smart power tool according to the first detection value after the startup is completed, and filters the variation of the first detection value under the slip condition to obtain the first detection value after filtering; determines the second detection value according to the first detection value after filtering; and finally compares the first detection value after filtering and the second detection value with the preset condition preset in software. If the first detection value after filtering and the second detection value satisfy the preset condition, it indicates that the electric drill/screwdriver levels the wood screw, and the controller controls the electric motor to stop rotating so as to control the electric drill/screwdriver to shut down. It can be seen that the controller can determine whether the wood screw is leveled by determining whether the first detection value after filtering and the second detection value satisfy the preset condition. When the first detection value after filtering and the second detection value satisfy the preset condition, it indicates that the wood screw is leveled, and the controller controls, in time, the electric motor to stop rotating so that the following problems can be avoided: when the electric drill/screwdriver drills the wood screw into the surface of the dry wall or the wood board, the electric motor fails to stop rotating in time, resulting in a poor nailing effect and low nailing efficiency of the wood screw.

Figure 7:
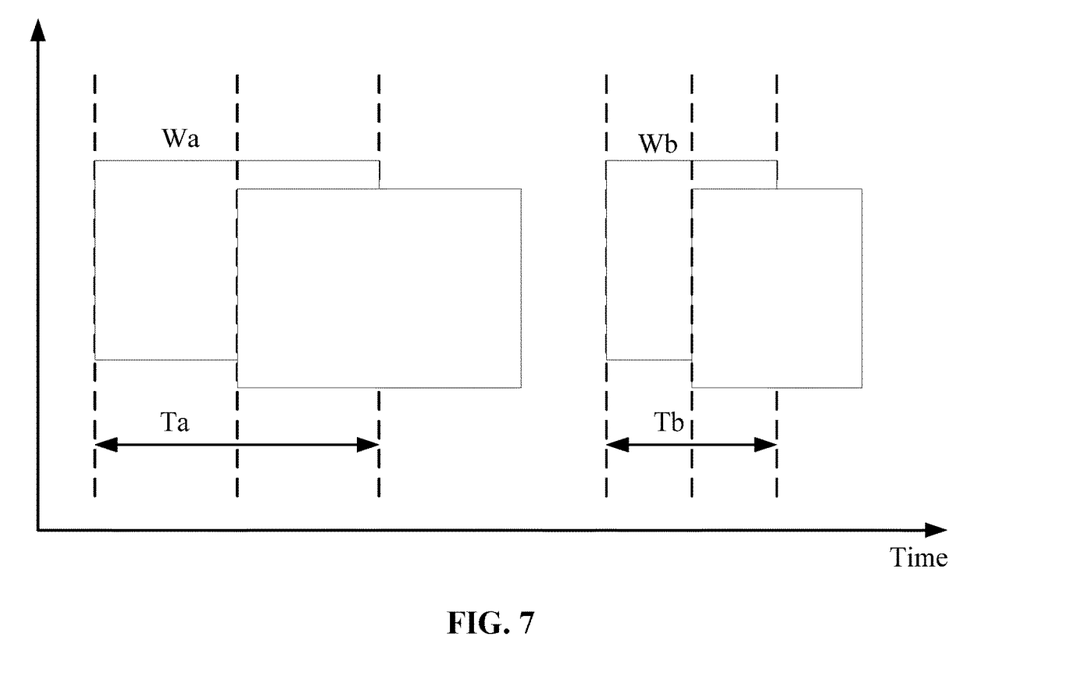
FIG. 7 is a schematic diagram of the principle of preset sliding windows according to an example of the present application.
Figure 8:
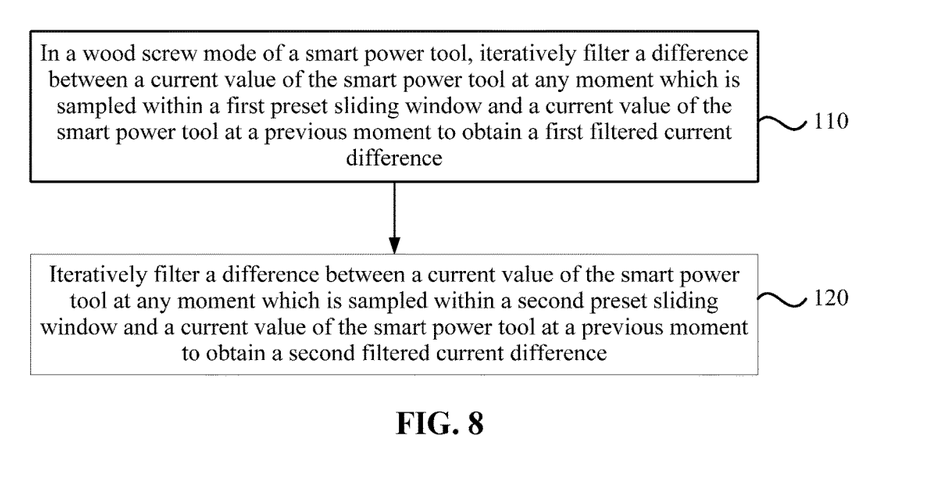
FIG. 8 is a flowchart of a calculation method of a first detection value according to an example of the present application.

FIG. 7 is a schematic diagram of the principle of preset sliding windows according to an example of the present application. FIG. 8 is a flowchart of a calculation method of a first detection value according to an example of the present application. Referring to FIG. 7, Wa and Wb are a first preset sliding window and a second preset sliding window, respectively, where Ta is a time length of the first preset sliding window Wa and Tb is a time length of the second preset sliding window Wb. Optionally, the time length Ta of the first preset sliding window Wa is a preset multiple of the time length Tb of the second preset sliding window Wb. The preset multiple may be 1.75 times.

Based on the preceding technical solutions, referring to FIG. 8, the first detection value includes a first filtered current difference and a second filtered current difference, and a calculation method for determining the first detection value according to the bus current value of the smart power tool in operation includes the steps below.

In step 110, in the wood screw mode of the smart power tool, a difference between a current value of the smart power tool at any moment which is sampled within the first preset sliding window and a current value of the smart power tool at a previous moment is iteratively filtered so as to obtain the first filtered current difference.

Assuming that $I_a(k)$ is the current value of the smart power tool at any moment which is sampled within the first preset sliding window, $I_a(k-1)$ is the current value of the smart power tool at the previous moment, the difference $\Delta I_a$ between the current value of the smart power tool at any moment which is sampled within the first preset sliding window and the current value of the smart power tool at the previous moment is as follows:

$$\Delta I_a = I_a(k) - I_a(k-1) \quad (5)$$

The difference $\Delta I_a$ between the current value of the smart power tool at any moment which is sampled within the first preset sliding window and the current value of the smart power tool at the previous moment is iteratively filtered so as to obtain the first filtered current difference $\overline{\Delta I_a}$.

In step 120, a difference between a current value of the smart power tool at any moment which is sampled within the second preset sliding window and a current value of the smart power tool at a previous moment is iteratively filtered so as to obtain the second filtered current difference.

Assuming that $I_b(k)$ is the current value of the smart power tool at any moment which is sampled within the second preset sliding window, $I_b(k-1)$ is the current value of the smart power tool at the previous moment, the difference $\Delta I_b$ between the current value of the smart power tool at any moment which is sampled within the second preset sliding window and the current value of the smart power tool at the previous moment is as follows:

$$\Delta I_b = I_b(k) - I_b(k-1) \quad (6)$$

The difference $\Delta I_b$ between the current value of the smart power tool at any moment which is sampled within the second preset sliding window and the current value of the smart power tool at the previous moment is iteratively filtered so as to obtain the second filtered current difference $\overline{\Delta I_b}$.

Specifically, after determining the first detection value according to the working mode of the smart power tool and the bus current value of the smart power tool in operation, the controller needs to determine whether the startup of the smart power tool is completed, so as to further distinguish the working state and prevent false determination.

Figure 9:
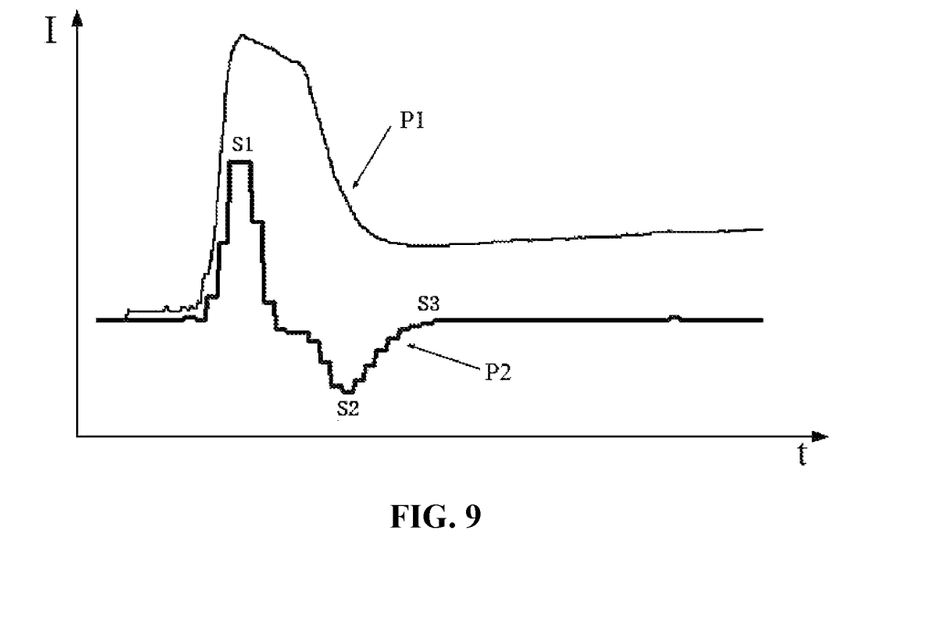
FIG. 9 is a change graph of a filtered current difference during the startup of a smart power tool according to an example of the present application.

Optionally, FIG. 9 is a change graph of a filtered current difference during the startup of a smart power tool according to an example of the present application. Based on the preceding technical solutions, that whether the startup of the smart power tool is completed is determined according to the first detection value includes the following.

A PWM value of the smart power tool is acquired, and if the PWM value of the smart power tool is greater than or equal to a preset PWM value, when the first filtered current difference and/or the second filtered current difference increases to a first preset threshold, decreases from the first preset threshold to a second preset threshold, and finally increases from the second preset threshold to a third preset threshold, the startup of the smart power tool is completed.

Whether the startup of the smart power tool is completed may be determined according to only the first filtered current difference. Whether the startup of the smart power tool is completed may be determined according to only the second filtered current difference. Whether the startup of the smart power tool is completed may be determined according to the first filtered current difference and the second filtered current difference. Which determination method is specifically used may be set according to actual situations and is not specifically limited in this example.

Specifically, an example in which whether the startup of the smart power tool is completed is determined according to the first filtered current difference is used. Referring to FIG. 9, P1 is a change curve of a filtered current of the smart power tool during startup and P2 is a change curve of the first filtered current difference calculated within the first preset sliding window Wa. Referring to curve P2, when the first filtered current difference increases from zero to the first preset threshold (for example, position S1 in the figure), decreases from the first preset threshold to the second preset threshold (for example, position S2 in the figure), and finally increases from the second preset threshold to the third preset threshold (for example, position S3 in the figure), it is determined that the startup of the smart power tool is completed. The first preset threshold is a positive value, the second preset threshold is a negative value, and the third preset threshold may be zero.

Therefore, the accuracy with which the working state of the smart power tool is determined can be further improved, preventing false determination and a false shutdown.

Figure 10:
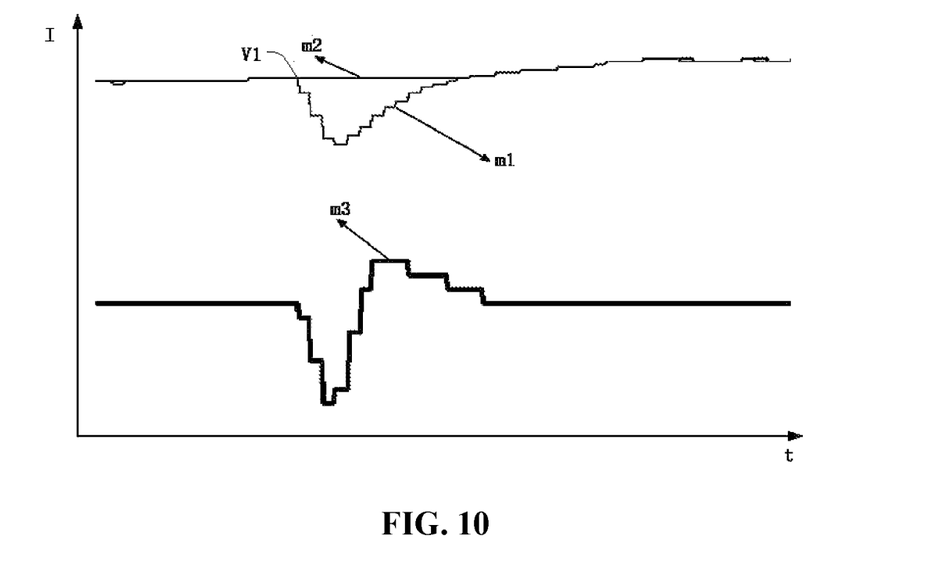
FIG. 10 is a change graph of a first detection value under a slip condition of a smart power tool according to an example of the present application.

Optionally, FIG. 10 is a change graph of a first detection value under a slip condition of a smart power tool according to an example of the present application. Referring to FIG. 10, m1 is a change curve of the bus current value of the smart power tool under the slip operation, m2 is a change curve of a current value with a slip filtered, and m3 is a change curve of a slope difference of the filtered current calculated based on the bus current value. The slip condition of the smart power tool may be identified after the startup is completed by the following method: the slip condition of the smart power tool is identified according to the first detection value and the variation of the first detection value under the slip condition is filtered, which may specifically include the following.

If the number of times the first filtered current difference and/or the second filtered current difference is continuously a negative value is greater than or equal to a fourth preset threshold and satisfies a first preset range, a minimum negative value is less than or equal to a fifth preset threshold, and the first filtered current difference and/or the second filtered current difference continuously decreases at least once, the slip condition of the smart power tool occurs, and a value of the first filtered current difference and/or the second filtered current difference under the slip condition is filtered so as to obtain a first filtered current difference after filtering and/or a second filtered current difference after filtering.

The fourth preset threshold may be 1, the first preset range may be 3 to 5, and the fifth preset threshold may be −4. The fourth preset threshold, the first preset range, and the fifth preset threshold may be other values and may specifically be set according to actual situations, which are not specifically limited in this example.

It is to be noted that the slip condition of the smart power tool may be identified by the following method: identification and determination are performed according to only a change situation of the first filtered current difference. That is, if the number of times the first filtered current difference is continuously a negative value is greater than or equal to the fourth preset threshold and satisfies the first preset range, the minimum negative value is less than or equal to the fifth preset threshold, and the first filtered current difference continuously decreases at least once, it is considered that the slip condition of the smart power tool occurs. The slip condition of the smart power tool may be identified by the following method: identification and determination are performed according to only a change situation of the second filtered current difference. If the number of times the second filtered current difference is continuously a negative value is greater than or equal to the fourth preset threshold and satisfies the first preset range, the minimum negative value is less than or equal to the fifth preset threshold, and the second filtered current difference continuously decreases at least once, it may be considered that the slip condition of the smart power tool occurs. The slip condition of the smart power tool may be identified by the following method: identification and determination are performed according to the change situation of the first filtered current difference and the change situation of the second filtered current difference. Which determination method is specifically used may be set according to actual situations and is not specifically limited in this example.

Optionally, referring to FIG. 10, an example in which the slip of the smart power tool is identified according to the change situation of the second filtered current difference is used. If the number of times the second filtered current difference is continuously a negative value is greater than or equal to 1 and is from 3 to 5, the minimum negative value is less than or equal to −4, and the second filtered current difference continuously decreases at least once, the slip condition of the smart power tool occurs. A current value V1 before the smart power tool enters a slip state is used as a comparison value. If a current in the slip state is greater than or equal to the current comparison value V1 or the second filtered current difference decreases to zero, it may be considered that the slip state ends. The value of the second filtered current difference under the slip condition is filtered, that is, the filtered current under the slip condition is equal to the comparison value V1 so that the second filtered current difference after filtering is obtained. It is to be noted that the slip condition of the smart power tool is identified and a current change under the slip condition is filtered so that a working current of the smart power tool remains stable, thereby preventing the slip condition from interfering with the identification of a normal working state.

Figure 11:
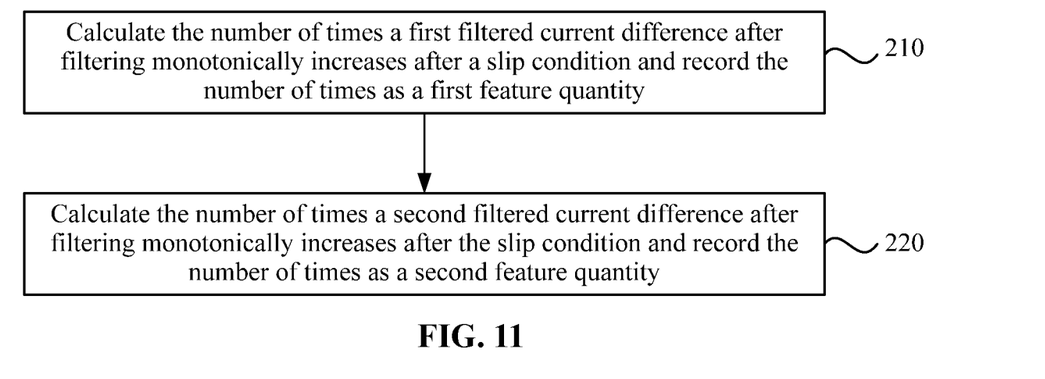
FIG. 11 is a flowchart of a calculation method of a second detection value according to an example of the present application.

FIG. 11 is a flowchart of a calculation method of a second detection value according to an example of the present application. Based on the preceding technical solutions, the second detection value includes a first feature quantity and a second feature quantity. Referring to FIG. 11, that the second detection value is determined according to the first detection value after filtering includes the following.

In step 210, the number of times the first filtered current difference after filtering monotonically increases after the slip condition is calculated and recorded as the first feature quantity.

In step 220, the number of times the second filtered current difference after filtering monotonically increases after the slip condition is calculated and recorded as the second feature quantity.

Optionally, in the calculation process, the first feature quantity is increased by 1 when the first filtered current difference increases and increased by 0 when the first filtered current difference decreases. Similarly, the second feature quantity is increased by 1 when the second filtered current difference increases and increased by 0 when the second filtered current difference decreases.

Optionally, that when the first detection value after filtering and the second detection value satisfy the preset condition, the electric motor is controlled to stop rotating so as to control the smart power tool to shut down includes the following.

When the first filtered current difference is greater than or equal to a sixth preset threshold and the first feature quantity is greater than or equal to a seventh preset threshold or when the second filtered current difference is greater than or equal to the sixth preset threshold and the second feature quantity is greater than or equal to the seventh preset threshold, the electric motor is controlled to stop rotating so as to control the smart power tool to shut down.

The sixth preset threshold may be 4 and the seventh preset threshold may be 3. The sixth preset threshold and the seventh preset threshold may be other values and may specifically be set according to actual situations, which are not specifically limited in this example.

It is to be noted that whether the wood screw is leveled may be determined only according to whether the first filtered current difference and the first feature quantity satisfy the preset condition. Whether the wood screw is leveled may be determined only according to whether the second filtered current difference and the second feature quantity satisfy the preset condition. Whether the wood screw is leveled may be determined according to whether the first filtered current difference, the first feature quantity, the second filtered current difference, and the second feature quantity satisfy the preset condition. The specific determination method may be set according to actual situations and is not specifically limited in the technical solutions of this example.

Figure 12:
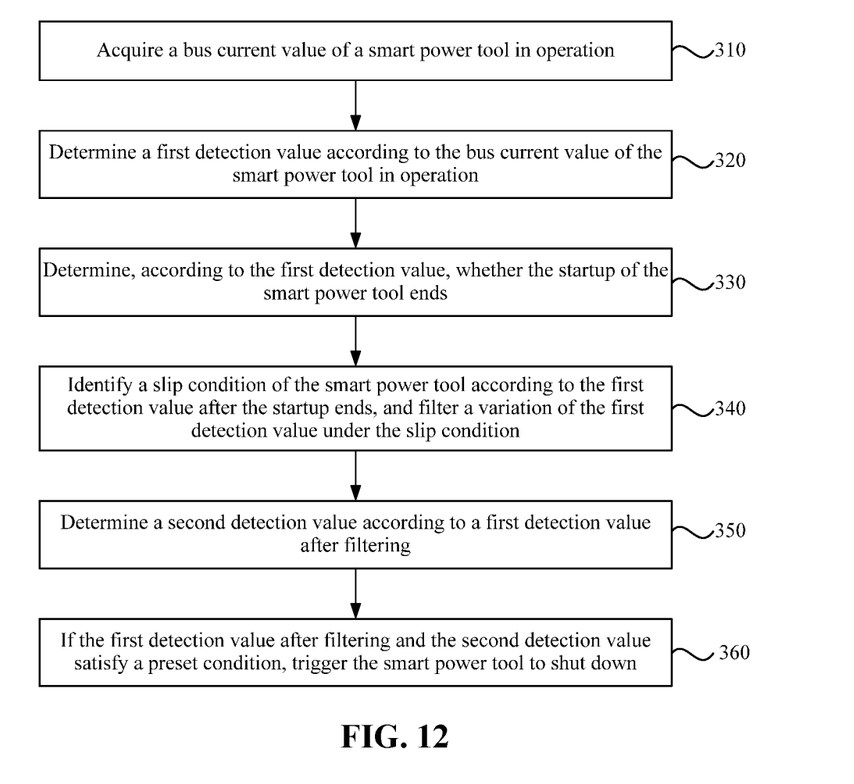
FIG. 12 is a flowchart of a control method of a smart power tool according to an example of the present application.

FIG. 12 is a flowchart of a control method of a smart power tool according to an example of the present application. Referring to FIG. 12, this example is applicable to an implementation process of a control method of a smart power tool. The method may be performed by the smart power tool and may specifically be implemented by software and/or hardware in the smart power tool. The method specifically includes the steps described below.

In step 310, a bus current value of the smart power tool in operation is acquired.

The smart power tool includes an electric motor, a controller, a detection unit, and the like. Specifically, the bus current value of the smart power tool in operation may be acquired by the detection unit, such as a current sampling circuit or a current sensor. The detection unit is electrically connected to the electric motor and the controller, separately.

The detection unit may be the current sampling circuit. The current sampling circuit may include a current detection resistor which can acquire the current value outputted from the smart power tool by acquiring a current flowing through the current detection resistor. The current sampling circuit acquires, in real time, the current value outputted from the electric motor and feeds back the current value acquired in real time to the controller in real time. The current acquired by the current sampling circuit may include a current of the smart power tool at any moment, for example, during startup, in a working process, and before a shutdown.

In step 320, a first detection value is determined according to the bus current value of the smart power tool in operation.

The first detection value includes a first filtered current difference and a second filtered current difference. Specifically, in a wood screw mode, the controller in the smart power tool iteratively filters a difference between a current value of the smart power tool at any moment within a first preset sliding window and a current value of the smart power tool at a previous moment, which are acquired in real time through the current sampling circuit, to obtain the first filtered current difference and iteratively filters a difference between a current value of the smart power tool at any moment within a second preset sliding window and a current value of the smart power tool at a previous moment to obtain the second filtered current difference. The first filtered current difference can reflect a change of a filtered current of the smart power tool within the first preset sliding window and the second filtered current difference can reflect a change of a filtered current of the smart power tool within the second preset sliding window.

In step 330, whether the startup of the smart power tool is completed is determined according to a PWM value and the first detection value.

Whether the startup of the smart power tool is completed is determined according to the first detection value so as to distinguish a working state of the smart power tool so that false determination can be avoided and the control effect of an automatic shutdown of the smart power tool is improved.

In step 340, a slip condition of the smart power tool is identified according to the first detection value after the startup is completed, and a variation of the first detection value under the slip condition is filtered.

The slip condition of the smart power tool is identified and a current change under the slip condition is filtered so that a working current of the smart power tool remains stable, thereby preventing interference with the identification of a normal working state.

In step 350, a second detection value is determined according to a first detection value after filtering.

The first detection value includes the first filtered current difference and the second filtered current difference and the second detection value includes a first feature quantity and a second feature quantity. The first feature quantity represents the number of times the first filtered current difference monotonically increases so that the first feature quantity can be determined according to the number of times the first filtered current difference monotonically increases. The second feature quantity represents the number of times the second filtered current difference monotonically increases so that the second feature quantity can be determined according to the number of times the second filtered current difference monotonically increases.

In step 360, if the first detection value after filtering and the second detection value satisfy a preset condition, the smart power tool is triggered to shut down.

The first detection value after filtering includes the first filtered current difference and the second filtered current difference and the second detection value includes the first feature quantity and the second feature quantity. Specifically, the preset condition may be set according to different working conditions of the smart power tool. For example, it may be set that when only the first filtered current difference and the first feature quantity satisfy the preset condition, the smart power tool is triggered to shut down. It may be set that when only the second filtered current difference and the second feature quantity satisfy the preset condition, the smart power tool is triggered to shut down. It may be set that when the first filtered current difference, the first feature quantity, the second filtered current difference, and the second feature quantity satisfy their respective preset thresholds, the smart power tool is triggered to shut down. It is to be noted that which preset condition the first detection value after filtering and/or the second detection value satisfies may be set according to specific working conditions. Only an example description is provided here and which conditions are specifically included is not specifically limited here.

According to the technical solutions in this example, the working principle of the control method of the smart power tool is described below. In the working process of the smart power tool, the bus current value outputted from the smart power tool is detected and acquired in real time, and the first detection value is determined according to the bus current value of the smart power tool in operation; whether the startup of the smart power tool is completed is determined according to the first detection value; the slip condition of the smart power tool is identified according to the first detection value after the startup is completed, and the variation of the first detection value under the slip condition is filtered; the second detection value is determined according to the first detection value after filtering; and if the first detection value after filtering and the second detection value satisfy the preset condition, the smart power tool is triggered to shut down. It can be seen that the controller can determine whether the wood screw is leveled by determining whether the first detection value after filtering and the second detection value satisfy the preset condition. The problems of an automatic shutdown failure in the case of leveling and low working efficiency in the related art are solved, the electric motor is controlled according to the first detection value after filtering and the second detection value to stop rotating so as to control the smart power tool to shut down, and when the wood screw is leveled, the smart power tool is controlled to automatically shut down, improving the working efficiency

What is claimed is:

1. A smart power tool, comprising:
    an output shaft for outputting torsion;
    an electric motor for driving the output shaft to rotate;
    a housing for accommodating the electric motor;
    a transmission assembly for connecting the electric motor to the output shaft;
    an adjustment assembly for adjusting a working mode of the smart power tool and outputting a mode signal, wherein the working mode comprises at least a drill gear mode;
    a detection unit for detecting a current value of the smart power tool in operation; and
    a controller configured to:
    receive the mode signal;
    determine a set of current variables according to the working mode and the current value of the smart power tool in operation, wherein the set of current variables comprises a current difference and a filtered current difference;

determine, according to the set of current variables, whether startup of the smart power tool is completed;

determine a set of feature quantities according to the set of current variables after the startup is completed;

determine a type of a drill bit of the smart power tool according to the set of feature quantities;

determine a working state of the smart power tool according to the set of current variables and/or the set of feature quantities and the type of the drill bit of the smart power tool; and control the electric motor to stop rotating so as to control the smart power tool to shut down when determining that the smart power tool is in a drill-through state.

2. The smart power tool according to claim 1, wherein determining the set of current variables according to the working mode and the current value of the smart power tool in operation comprises:

in the drill gear mode of the smart power tool, calculating a difference between a current value of the smart power tool at any moment which is sampled within a first preset sliding window and a current value of the smart power tool at a previous moment to obtain the current difference, and iteratively filtering the current difference to obtain the filtered current difference.

3. The smart power tool according to claim 1, wherein determining, according to the set of current variables, whether the startup of the smart power tool is completed comprises:

acquiring a pulse-width modulation (PWM) value of the smart power tool, and in a case of the PWM value of the smart power tool is greater than or equal to a preset PWM value, when the filtered current difference increases to a first preset threshold, decreases from the first preset threshold to a second preset threshold, increases from the second preset threshold to a third preset threshold, decreases from the third preset threshold to a fourth preset threshold, and finally increases from the fourth preset threshold to a value of zero, determining that the startup of the smart power tool is completed.

4. The smart power tool according to claim 1, wherein the set of feature quantities comprises a first feature quantity, a second feature quantity, an oscillator ramp count, and a number of oscillation noise times, and determining the set of feature quantities according to the set of current variables after the startup is completed comprises:

determining, according to the filtered current difference and a time count, an integral of the filtered current difference with respect to the time count and recording the integral as the first feature quantity;

calculating the oscillator ramp count according to the filtered current difference;

calculating the number of oscillation noise times according to a current difference and an oscillation amplitude of a current signal within a second preset sliding window; and determining a pre-ramp and post-ramp current ratio according to a pre-ramp current value and a post-ramp current value of an oscillator ramp signal and recording the pre-ramp and post-ramp current ratio as the second feature quantity.

5. The smart power tool according to claim 4, wherein the first feature quantity is calculated by the following formula:

$$M_1 = \int_0^t (\bar{I} - a_1)$$

wherein $M_1$ denotes the first feature quantity, $\bar{I}$ denotes the filtered current difference, and $a_1$ denotes a fixed parameter.

6. The smart power tool according to claim 4, wherein, when the filtered current difference is continuously less than a fifth preset threshold or when the filtered current difference is continuously greater than a sixth preset threshold, the oscillator ramp count is increased by 1, and wherein an initial value of the oscillator ramp count is 0.

7. The smart power tool according to claim 4, wherein, within the second preset sliding window, when a difference between a peak current difference and a valley current difference at each oscillation of the current difference is less than or equal to a seventh preset threshold or is greater than or equal to an eighth preset threshold, the number of oscillation noise times is increased by 1.

8. The smart power tool according to claim 4, wherein the second feature quantity is calculated by the following formula:

$$K_j = (I_{later} - I_{front}) * 100 / I_{later}$$

wherein $K_j$ denotes the second feature quantity, $I_{front}$ denotes the pre-ramp current value, and $I_{later}$ denotes the post-ramp current value.

9. The smart power tool according to claim 4, wherein determining the type of the drill bit of the smart power tool according to the set of feature quantities comprises the following:

when the oscillator ramp count is less than or equal to a ninth preset threshold, when the number of oscillation noise times is greater than or equal to a tenth preset threshold, the drill bit of the smart power tool is a common spade drill bit; or when the oscillator ramp count is less than or equal to the ninth preset threshold, when the first feature quantity is greater than or equal to an eleventh preset threshold, the drill bit of the smart power tool is a self-tapping drill bit; or when the oscillator ramp count is greater than or equal to a twelfth preset threshold, the drill bit of the smart power tool is a twist drill bit; or when the oscillator ramp count is greater than or equal to the twelfth preset threshold, when the number of oscillation noise times is greater than or equal to the tenth preset threshold, the drill bit of the smart power tool is the common spade drill bit.

10. The smart power tool according to claim 4, wherein determining the working state of the smart power tool according to the set of current variables and/or the set of feature quantities and the type of the drill bit of the smart power tool comprises the following:

when the drill bit of the smart power tool is a twist drill bit, when the second feature quantity is greater than or equal to a thirteenth preset threshold, the working state of the smart power tool is the drill-through state; and when the drill bit of the smart power tool is a self-tapping drill bit or a common spade drill bit, when the second feature quantity is greater than or equal to a fourteenth preset threshold, the working state of the smart power tool is the drill-through state.

11. The smart power tool according to claim 4, wherein determining the working state of the smart power tool according to the set of current variables and/or the set of feature quantities and the type of the drill bit of the smart power tool comprises the following:

when the drill bit of the smart power tool is a twist drill bit, when the filtered current difference is less than or equal to 0 and lasts for a first preset time, the working state of the smart power tool is the drill-through state.

12. The smart power tool according to claim 1, wherein the controller is further configured to:
after the startup is completed, determine a loaded state of the smart power tool according to a change of the filtered current difference and, when the filtered current difference is greater than or equal to a fifteenth preset threshold and lasts for a second preset time, the smart power tool enters the loaded state.

13. A control method of a smart power tool, comprising:
acquiring a current value of the smart power tool in operation;
determining a set of current variables according to the current value of the smart power tool in operation, wherein the set of current variables comprises a current difference and a filtered current difference;
determining, according to the set of current variables, whether startup of the smart power tool is completed;
determining a set of feature quantities according to the set of current variables after the startup is completed;
determining a type of a drill bit of the smart power tool according to the set of feature quantities; and
determining a working state of the smart power tool according to the set of current variables and/or the set of feature quantities and the type of the drill bit of the smart power tool and when the smart power tool is in a drill-through state, controlling the smart power tool to shut down.

14. A smart power tool, comprising:
an output shaft for outputting torsion;
an electric motor for driving the output shaft to rotate;
a housing for accommodating the electric motor;
a transmission assembly for connecting the electric motor to the output shaft;
an adjustment assembly for adjusting a working mode of the smart power tool and outputting a mode signal, wherein the working mode comprises at least a wood screw mode;
a detection unit for detecting a bus current value of the smart power tool in operation; and
a controller configured to:
receive the mode signal;
determine a first detection value according to the working mode and the bus current value of the smart power tool in operation;
determine, according to the first detection value, whether startup of the smart power tool is completed;
identify a slip condition of the smart power tool according to the first detection value after the startup is completed, and filter a variation of the first detection value under the slip condition;
determine a second detection value according to a first detection value after filtering; and
control the electric motor to stop rotating so as to control the smart power tool to shut down when the first detection value after filtering and the second detection value satisfy a preset condition.

15. The smart power tool according to claim 14, wherein the first detection value comprises a first filtered current difference and a second filtered current difference, and determining the first detection value according to the bus current value of the smart power tool in operation comprises:
in the wood screw mode of the smart power tool, iteratively filtering a difference between a current value of the smart power tool at any moment which is sampled within a first preset sliding window and a current value of the smart power tool at a previous moment to obtain the first filtered current difference; and
iteratively filtering a difference between a current value of the smart power tool at any moment which is sampled within a second preset sliding window and a current value of the smart power tool at a previous moment to obtain the second filtered current difference.

16. The smart power tool according to claim 15, wherein a time length of the first preset sliding window is a preset multiple of a time length of the second preset sliding window.

17. The smart power tool according to claim 15, wherein determining, according to the first detection value, whether the startup of the smart power tool is completed comprises:
when the first filtered current difference and/or the second filtered current difference increases to a first preset threshold, decreases from the first preset threshold to a second preset threshold, and finally increases from the second preset threshold to a third preset threshold, determining that the startup of the smart power tool ends.

18. The smart power tool according to claim 17, wherein the controller is further configured to: acquire a pulse-width modulation (PWM) value of the smart power tool, and, when the PWM value of the smart power tool is greater than or equal to a preset PWM value, determine according to the first detection value, whether the startup of the smart power tool is completed.

19. The smart power tool according to claim 15, wherein identifying the slip condition of the smart power tool according to the first detection value after the startup of the smart power tool ends, and filtering the variation of the first detection value under the slip condition comprise:
when a number of times the first filtered current difference and/or the second filtered current difference is continuously a negative value is greater than or equal to a fourth preset threshold and satisfies a first preset range, a minimum negative value is less than or equal to a fifth preset threshold, and the first filtered current difference and/or the second filtered current difference continuously decreases at least once, determining that the slip condition of the smart power tool occurs, and filtering a value of the first filtered current difference and/or the second filtered current difference under the slip condition to obtain a first filtered current difference after filtering and/or a second filtered current difference after filtering.

20. The smart power tool according to claim 19, wherein the second detection value comprises a first feature quantity and a second feature quantity, and determining the second detection value according to the first detection value after filtering comprises:
calculating a number of times the first filtered current difference after filtering monotonically increases after the slip condition and recording the number of times as the first feature quantity; and
calculating a number of times the second filtered current difference after filtering monotonically increases after the slip condition and recording the number of times as the second feature quantity.

* * * * *